F. MICHAEL.
Evaporating Pan.
No. 62,147.
Patented Feb. 19, 1867.
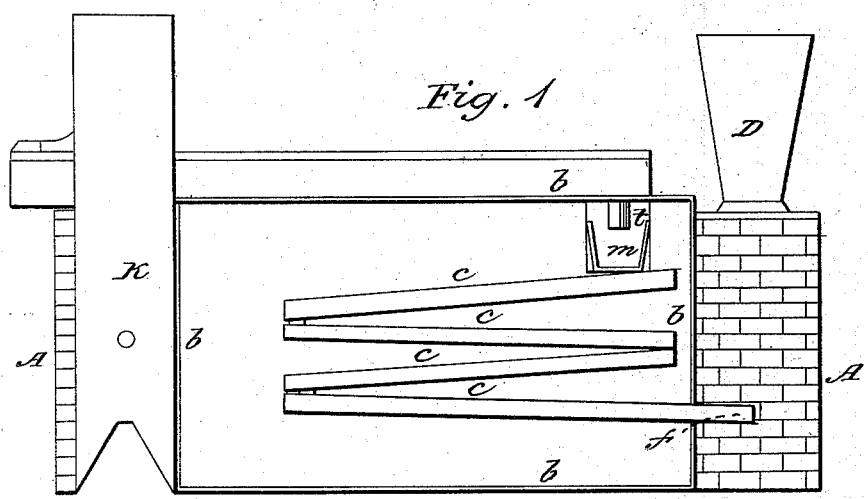
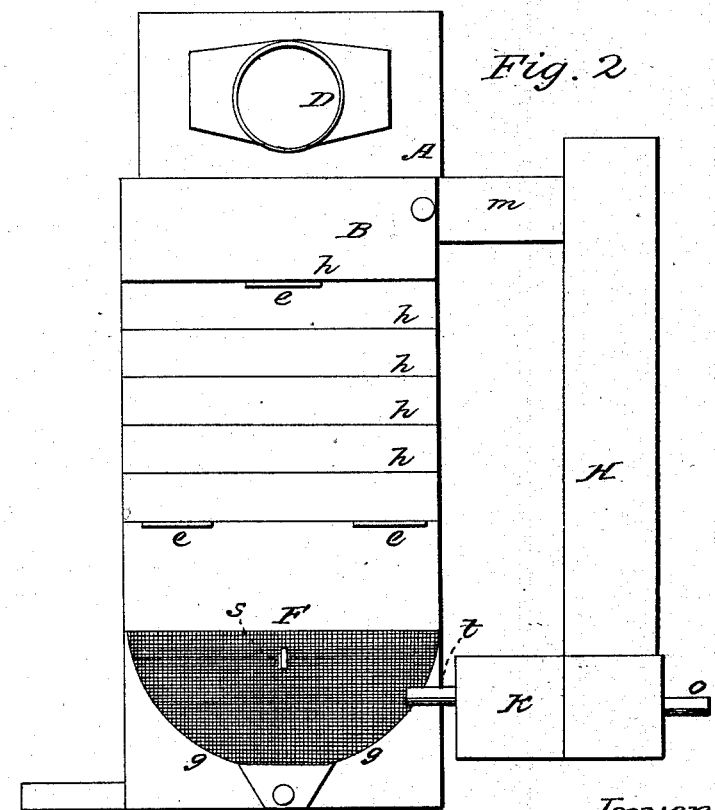

United States Patent Office.

F. MICHAEL, OF GRATIS, OHIO.

Letters Patent No. 62,147, dated February 19, 1867.

---

IMPROVED EVAPORATOR.

---

The Schedule referred to in these Letters Patent and making part of the same.

---

TO ALL WHOM IT MAY CONCERN:

Be it known that I, F. MICHAEL, of Preble county, in the State of Ohio, have invented certain new and useful improvements in Sorghum Evaporators; and I hereby declare that the following is a true, full, and exact description of the same, reference being had to the accompanying drawings, and to the letters of reference marked thereon. In the annexed drawings, which are made a part of this specification—

Figure 1 represents a side elevation of my evaporator.

Figure 2 is a plan view of the same.

The letter A represents the furnace constructed in the ordinary manner, with the chimney at one end and the furnace doors at the other. B designates the pan in which the sorghum is evaporated. The pan B is made to extend from near the chimney D to a little beyond the opposite end of the furnace, and is furnished at bottom with a metal rim on each side extending lengthwise of the pan B. These rims fit inside of the furnace walls and hold the pans firmly in position. The pan B is supplied with a series of transverse partitions $h$, all of which, with the exception of the two outside ones, are raised at bottom a little above the surface of pan B to admit of the flow of the sirup from one to the other. The two outer partitions are furnished with the sliding doors $e$, which can be raised or lowered as the occasion requires. The end of pan B, over the mouth of the furnace, contains the filter F, having the rims $g$ extending from its front edge to the end of pan B, to which they are fastened. These rims may be made of two pieces each, or of one piece. Through the filter F a screw, $s$, is made to pass, the lower end of the screw resting on the bottom of pan B. By means of this screw, the filter can be raised or depressed at a suitable angle. Through one side of the furnace, near the chimney D, an opening is made to receive the conduit $m$ for conveying the sirup out of pan B when required, a hole being made through the bottom of pan B immediately above the conduit for the above-named purpose. At a suitable distance from the side of the furnace A, and parallel with it, is placed the cooler H, (see fig. 1.) The cooler H is stayed to the side of the furnace A in any desired manner. A rim, $b$, surrounds the cooler H, and extends from the bottom of the cooler outwards. There are four troughs or conduits $c$ fastened to the inner surface of cooler H; the whole of these troughs are placed at a descending angle, (see fig. 1,) with holes through the lower end of three of them for the escape of the sirup into the one beneath. The lowest trough discharges the sirup through a projecting end, $f$, into the vessel placed to receive it. K represents the filter box, which is placed opposite the filter F and at the end of cooler H, with its outer side nearly in a line with the front end of the furnace A. The box K has a cover extending half way over its top, and made perfectly tight at bottom, with a lateral partition running from the top to within an inch of the bottom. The box K is furnished with a spout, $t$, extending immediately over the filter F for discharging the sirup into said filter. On the opposite side of box K is another spout, $o$, intended to draw off any sediment that may be deposited at the bottom of box K.

In operating my evaporator, the juice of the sorghum will first be poured into filter-box K, and any foreign matter contained in said juice will settle in the chamber at the bottom of the filter-box K. When the gross matter is thus precipitated, the juice above the spout $t$ is discharged through said spout into or over the filter F, and by this second process is freed from the finer impurities that may be found in it. At the time that the juice is filtering, the sliding doors in the two outer partitions $h$ are raised so that the juice may flow over the whole length of pan B. When the boiling process is completed, the sirup is either drawn off into the cooler H through conduit $m$, or if the sirup is intended to go through a second process for granulation, it will be discharged by means of a hole in the bottom of pan B, near the outer edge of filter F, and conducted to the required point by a pipe.

Having thus described my invention, what I claim, and desire to secure by Letters Patent, is—

1. The filter F, with regulating screw $s$, in combination with pan B, the whole constructed and operating in the manner and for the purpose herein set forth.

2. A combination of pan B, filter-box K, cooler H, and conduit $m$, the whole constructed, arranged, and operating substantially as herein described.

In testimony that I acknowledge the foregoing as my own, I hereby affix my signature in the presence of two witnesses.

F. MICHAEL.

Witnesses:
HENRY BOWMAN,
A. STIVER.